Patented Mar. 6, 1928.

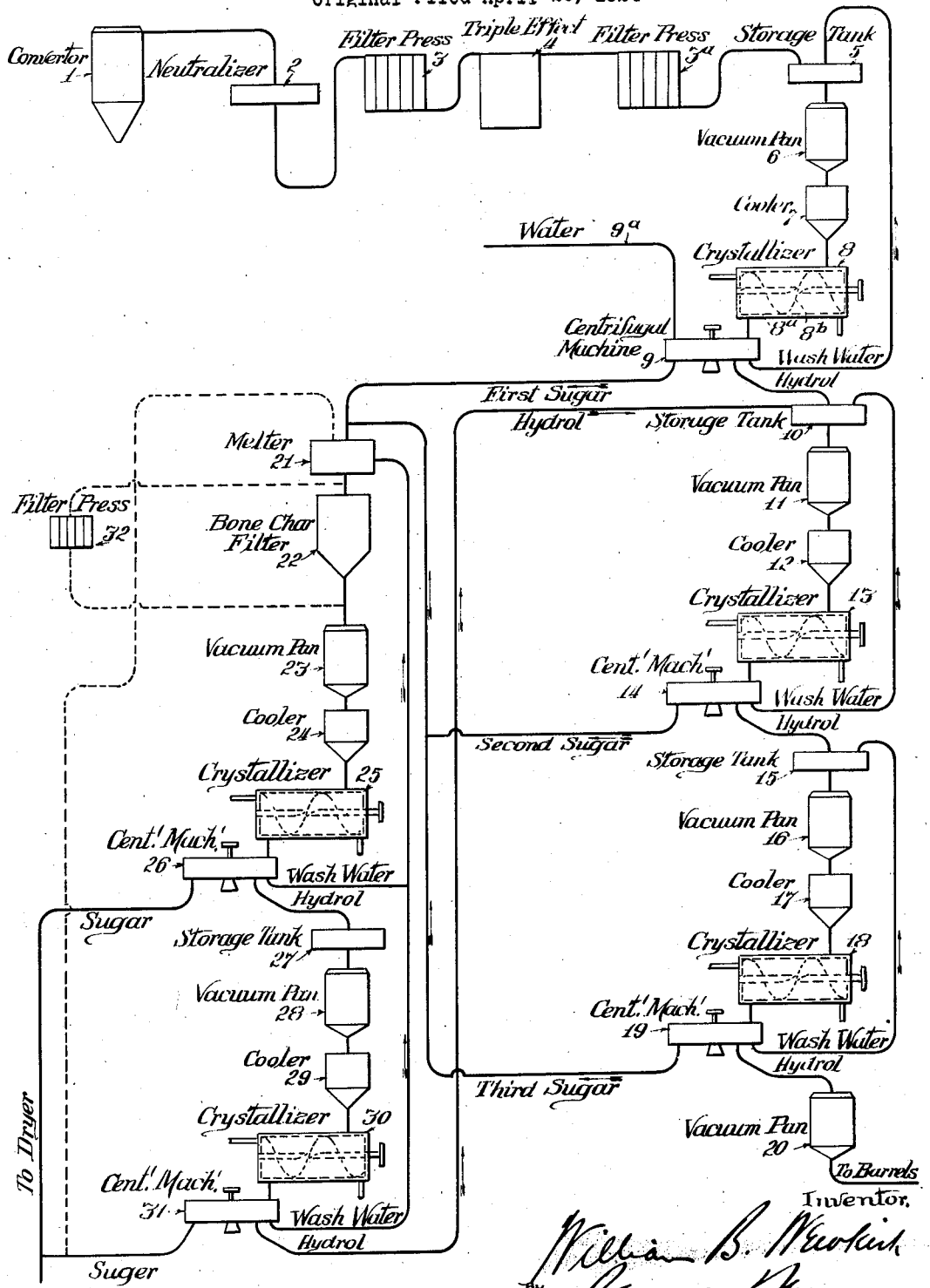

1,661,298

UNITED STATES PATENT OFFICE.

WILLIAM B. NEWKIRK, OF RIVERSIDE, ILLINOIS, ASSIGNOR, BY MESNE ASSIGNMENTS, TO INTERNATIONAL PATENTS DEVELOPMENT COMPANY, A CORPORATION OF DELAWARE.

METHOD OF MANUFACTURING DEXTROSE FROM STARCH.

Application filed April 25, 1924, Serial No. 708,916. Renewed December 7, 1927.

My invention relates to the manufacture of crystalline starch converted sugar such as dextrose or grape sugar, particularly a product having a very high purity, from starch or starch bearing material through the conversion of the starch, the crystallization of the dextrose and the separation of the dextrose crystals from the mother liquor; and the primary object of the invention is to improve upon the method of manufacturing crystalline dextrose disclosed in my Patent No. 1,471,347 granted October 23, 1923, in respect, particularly, to decreasing the cost of manufacture and also to insuring more certain and reliable results by lessening the need of such close supervision and control of the process as has been heretofore necessary during certain stages thereof.

In carrying out the process of Patent 1,471,347 the converted liquor before being concentrated and crystallized is purified by being brought into contact with animal charcoal or equivalent substance, the usual method being to pass the liquor through what are termed bone char filters which act not only to remove suspended impurities, but to discolorize or partially discolorize the liquor and remove impurities which the ordinary filters are incapable of removing. This bone char filtering operation is slow and expensive. The bone char requires revivifying at frequent intervals, the equipment in filters and char is costly, and the apparatus takes up a large amount of space in the factory. Some such treatment of the converted liquor prior to crystallization has, however, been considered as essential and the employment of bone char filters or their equivalents at this stage of the process has been universal heretofore so far as I am aware.

I have now discovered that it is possible, and for certain reasons very desirable, to concentrate and crystallize the converted liquor without first filtering the same through bone char, and, in place of the carbon filtration of the converted liquor, to subject the sugar, liquefied by melting, to a carbon filtration, thereafter re-crystallizing the filtrate. The advantages of omitting the carbon filtration precedent to crystallization are: First, the bone char filtering operation when subsequently employed in the process is much facilitated, a smaller equipment can be used, the bone does not need to be revivified as often, and the time and labor required are lessened; second, the crystallizing operations require less care and attention: the first operation because, inasmuch as the sugar is (in the preferred form of the invention) to be re-melted, complete purging is a matter of less importance than heretofore; and the second crystallization because the liquor is relatively free of impurities; third, it is possible to obtain, when desired, a larger grained sugar than heretofore due to the higher purity of the liquor employed in the second crystallizing operation; and fourth, it is possible to obtain very cheaply a relatively impure but crystalline or granular dextrose by stopping the process after the first purging operation, that is to say, by omitting the re-melting, the bone char filtering and the re-crystallizing of the sugar; or a better product by re-melting the sugar, filtering in filter press and re-crystallizing without any carbon filtration. In such cases the product will be dry and crystalline in form but may contain a certain small percentage of impurities especially when the first mentioned process under this heading is followed.

The novel features of the process constituting my present invention will be best understood by reference to the annexed drawing which is a flow sheet diagram illustrating the improved process.

The starch is converted in any suitable manner, for example, by the usual process of acid hydrolysis, in converter 1, the conversion being carried, preferably, to the highest point possible. A converted liquor having a dextrose content of from 88% to 90% (based on dry substances) will suffice. The converted liquor is then neutralized in the neutralizer 2 and filtered in filter press 3. The filtrate is concentrated in the triple effect machine 4 preferably to as high a density as can be filtered, 30° Baumé, for example, and is then run through another filter press 3ª to remove impurities precipitated by concentration and thereafter into a storage tank 5.

The liquor is now ready for the concentration step preceding crystallization. There need not have been the customary bone char filtering. The filtration by press 3 merely eliminates solids in suspension. The color of the liquor is not affected. The liquor contains the solubles and, in a large measure, the colloidal impurities which it is the function of the bone black in part to remove. The liquor in this condition is run from storage tank 5 into vacuum pan 6 where it is concentrated to a density of from approximately 38° Baumé to 45° Baumé. The temperature of the liquor in the vacuum pan will vary. It may be as high as 180° Fahrenheit. From the vacuum pan the concentrated liquor is run into a cooler 7 and from the cooler into a crystallizer 8, the latter being provided with a water jacket 8$^a$ and a rotary agitator 8$^b$. The liquor run into the crystallizer is mixed with a relatively large quantity of "foots", that is, crystals mixed with mother liquor, from the previous crystallizing operation. Preferably the fresh liquor is run into the crystallizer before the foots from the last batch have had an opportunity to set. I find that the best and most economical results are obtained by having each batch consist of approximately 40% foots and 60% fresh liquor. The foots will be at a relatively low temperature, between 80° and 90° Fahrenheit, for example, or possibly a little lower than this, and the aim is to cool the fresh liquor introduced into cooler 7 to such a temperature that when this liquor is mixed with the foots the batch will be at the proper temperature for initiating crystallization. Assuming that a hydrate product is to be manufactured, the preferable initial temperature for the batch, that is, the temperature of the mixture of fresh liquor and foots, is approximately 105° Fahrenheit, although, because of the large quantity of foots (seed crystals) present the initial temperature may be considerably above 105° Fahrenheit. In fact, it may be as high as 130° Fahrenheit. This temperature is, of course, well within the anhydrous range, that is, the range of temperatures favorable to the growth of anhydrous crystals, but with a large quantity of the hydrate solid phase, 40% for instance, there will be no substantial tendency toward or favorable to the growth of anhydrous crystals. The large quantity of the hydrate solid phase particularly when in a growing or developing stage dominates the process of crystallizing the dextrose out of solution. That is to say, the presence of the solid phase is a significant factor in the control of the process making other factors of relatively less importance. It thus becomes possible to obtain a purgible magma even with a liquor relatively impure.

Water may be circulated through the jacket 8$^a$ of crystallizer 8 for the purpose of dissipating excessive heating resulting from the crystallizing operation. Later if radiation from the magma in the crystallizer does not diminish the temperature of the mass fast enough this diminution may be accomplished by circulation of water through the jacket. The process contemplates a considerable reduction of temperature of the magma during the crystallizing operation and particularly toward the end of that operation. It is possible, in fact, to reduce the temperature to a point between 90° and 80° Fahrenheit without the throwing out of false grain, that is, minute crystalline particles. Under ordinary processes false grain is developed at temperatures as low as these. But after crystallization has proceeded to a certain point at the higher temperatures it is possible to reduce the crystallizing temperature, giving an added yield without danger of false grain and this is particularly so where, in the beginning, the ratio of seed to solution is large. The agitator is revolved slowly during the crystallizing operation keeping the material in gentle movement.

After the crystallizing operation is complete 60% approximately of the magma is withdrawn and introduced into the centrifugal machine 9, the remaining 40% being retained for mixing with the next batch of fresh liquor. The magma introduced into centrifugal machine 9 is first centrifuged to expel the mother liquor or hydrol which goes to the storage tank 10, the sugar being then washed with water admitted to the centrifugal machine through pipe 9$^a$. The wash water from the centrifugal machine is introduced into the process at any suitable stage. Preferably it is run into the storage tank 5.

The sugar from centrifugal machine 9 is given certain additional treatments, to be hereinafter described, preferably together with batches of sugar derived from further treatment of the hydrol from centrifugal machine 9. Before describing the treatment of the sugar I will outline the process to which the hydrol or mother liquor from the first centrifuging operation in machine 9 is subjected, which is as follows:

The hydrol is drawn from storage tank 10 into vacuum pan 11 where it is concentrated to a density of from approximately 38° Baumé to 42° Baumé. The liquor containing a smaller amount of dextrose and a larger amount of impurities then the original starch converted liquor is somewhat more viscous and, therefore, should not, ordinarily be evaporated to as high a degree of concentration. From vacuum pan 11 the concentrated liquor goes into a cooler 12 and from there to a crystallizer 13 where it is mixed with foots and crystallized in the manner described in connection with crystallization in the crystallizer 8. The magma from crystallizer 13 is run into centrifugal machine 14, the hydrol spun off and stored in vessel 15, and the sugar then washed with water. The wash water is preferably run into hydrol storage tank 10.

The hydrol from centrifugal machine 14 may be withdrawn from the process and sold as a by-product, or it may be given another series of treatments for a third yield of sugar. The diagram indicates the latter procedure which is as follows:

The hydrol from storage tank 15 is re-concentrated in a vacuum pan 16 to a density of from 36° Baumé to 40° Baumé, and is then run into a cooler 17 and from the cooler into a crystallizer 18 where it is mixed with foots and crystallized in substantially the same manner as described in connection with the crystallizing operations in crystallizers 8 and 13. The magma is centrifuged in centrifugal machine 19, the resulting hydrol concentrated in vacuum pan 20 and the sugar washed with water, the wash water being introduced, preferably, into the hydrol storage tank 15. The hydrol concentrated at 20 is ready for the market.

The three batches of dextrose, designated as first sugar, second sugar and third sugar, on the diagram, are preferably mixed together and melted in a melter 21. The melted sugar is then, preferably, run through a bone char filter 22 which, however, can be of relatively small proportions since the quantity of the sugar liquor is very much smaller than the quantity of the liquor produced by the starch conversion and contains a disproportionately smaller amount of impurities. The liquor from the bone char filter 22 is concentrated in vacuum pan 23, introduced into a cooler 24 and then into crystallizer 25 where it is mixed with foots and crystallized in the manner previously described in connection with the crystallizing operations in crystallizers 8, 14 and 20. The mixture of dextrose crystals and mother liquor is then centrifuged and washed in centrifugal machine 26, the hydrol going to storage vessel 27 and the wash water to the melter 21. The sugar which will be of a very high degree of purity, 99.5% dextrose or higher, is conveyed to driers and when dried is ready for the market. The hydrol in vessel 27 is introduced into a vacuum pan 28 where it is concentrated, preferably to a density between 38° Baumé and 45° Baumé, and is then cooled in cooler 29 and introduced into crystallizer 30 where it is mixed with foots from the last crystallizing operation in this vessel, and is crystallized in the manner heretofore described in connection with previous crystallizing operations. The magma from the crystallizer is run into centrifugal machine 31, the hydrol from which is preferably introduced into the process at a point at which such hydrol and the liquid with which it is mixed will have substantially the same degree of purity. For example, it may run into the hydrol storage vessel 10. The wash water from centrifugal machine 31 is preferably introduced into the melter 21. If the sugar from centrifugal machine 31 has the requisite degree of purity it may be run to the driers. If not, it can be melted up in melter 21 and given the re-treatment according to the procedure described as following the melting of the sugar in melter 21.

Under certain circumstances it is possible to obtain a fairly high purity sugar even when the bone black filtering operation is omitted entirely. In such case the sugar liquor from melter 21 will be run through a rag filter or filter press 32 and then into the vacuum pan 23. In other words, the bone char filter 22 will be eliminated. In re-treating the hydrol it is possible to eliminate the reconcentration of the liquor as described in my patent above referred to, although this procedure is not considered desirable.

It will be understood that the vacuum pans, coolers, crystallizers and centrifugal machines referred to in the above description may be of like construction in the case of each class of apparatus.

I do not claim broadly herein the preferred features of the process consisting in the cooling of the liquor preliminarily to introducing into the crystallizers and the use of the relatively large quantities of fresh foots for the crystallizing operations as these features are made the subject of matter of a co-pending application filed April 11, 1924, Serial No. 705,780 (for which has been substituted application Serial No. 736,945, filed September 10, 1924, and patented as No. 1,521,830, January 6, 1925).

It is realized that the hereindescribed method may be varied in certain respects without departure from the principles of my invention. In fact, in the matter of temperatures and densities and other working details something must be left to the discretion of the operator since the handling of the material will necessarily have to be varied in accordance with the type and grade of dextrose desired to be produced and in accordance with the character and relative purity of the converted liquor used. The method is applicable to the production of anhydrous sugar, for example, in which case the crystallization temperatures will be higher, as set forth in the patents referred to. By the term "of one type" used in referring to the dextrose produced by the process or employed as seed, I intend either the hydrate or the anhydrous dextrose to the substantial exclusion of the other type.

I claim:

1. Method of making a crystalline starch converted dextrose which comprises concentrating and crystallizing the converted liquor without precedent carbon filtration, and separating the dextrose crystals from the mother liquor while the magma is in a fluent state.

2. Method of making a crystalline starch converted dextrose which comprises concentrating and crystallizing the converted liquor without precedent carbon filtration, separating the dextrose crystals from the mother liquor, melting the crystalline dextrose and subjecting the same to a second crystallizing operation.

3. Method of making a crystalline starch converted dextrose which comprises concentrating and crystallizing the converted liquor without precedent carbon filtration, melting the crystalline dextrose and subjecting the same to a carbon filtration and to a second crystallizing operation.

4. Method of making crystalline dextrose which consists in converting the starch, concentrating the converted liquor without precedent carbon filtration, cooling the concentrated liquor, then bringing the liquor into contact with solid phase dextrose in the form of foots from a previous crystallizing operation to crystallize the dextrose in the liquor, centrifuging the magma of crystals and mother liquor to remove the latter, melting the sugar and subjecting the same to carbon filtration, cooling the filtrate and bringing the same into contact with foots from a previous crystallizing operation, and centrifuging the magma to remove impurities.

5. Improvement in the method of manufacturing a starch converted, crystalline dextrose, which improvement consists in concentrating and crystallizing the converted liquor without carbon filtration and after separation from the dextrose of the mother liquor purifying the sugar in melted condition by contact with carbon, then recrystallizing the same and separating impurities from the crystals.

6. Method of making a crystalline starch converted dextrose which comprises concentrating the converted liquor and, without precedent carbon filtration, crystallizing the same in motion, in the presence of solid phase dextrose of one type only and at a temperature and concentration which will give a purgable mixture of mother liquor and crystals of one type only, and centrifuging said mixture to separate the mother liquor from the crystals.

7. Method of making a crystalline starch converted dextrose which comprises concentrating the converted liquor and, without precedent carbon filtration, crystallizing the same in motion, in the presence of a solid phase dextrose of one type in such relatively large amount that the quantity of the solid phase is a significant factor in controlling crystallization and at a temperature to produce a purgable mixture of mother liquor and dextrose crystals of said one type only, and centrifuging the mixture to remove the mother liquor.

8. Method of making a crystalline starch converted dextrose which comprises concentrating the converted liquor and, without precedent carbon filtration, crystallizing the same in motion, in the presence of solid phase dextrose of one type only and at a temperature and concentration which will give a purgable mixture of mother liquor and crystals of one type only, centrifuging said mixture while in a fluent state to separate the mother liquor from the crystals, melting the dextrose and subjecting the same to recrystallization.

9. Method of making a crystalline starch converted dextrose which comprises concentrating the converted liquor and, without precedent carbon filtration, crystallizing the same in motion, in the presence of solid phase dextrose of one type only and at a temperature and concentration which will give a purgable mixture of mother liquor and crystals of one type only, centrifuging said mixture to separate the mother liquor from the crystals, melting the dextrose and subjecting the same to carbon filtration and recrystallization.

10. Method of making a crystalline starch converted dextrose which comprises concentrating the converted liquor and, without precedent carbon filtration, crystallizing the same in motion, in the presence of a solid phase dextrose of one type in such relatively large amount that the quantity of the solid phase is a significant factor in controlling crystallization and at a temperature to produce a purgable mixture of mother liquor and dextrose crystals of said one type only, centrifuging the mixture to remove the mother liquor, melting the dextrose and subjecting the same to recrystallization.

11. Method of making a crystalline starch converted dextrose which comprises concentrating the converted liquor and, without precedent carbon filtration, crystallizing the same in motion, in the presence of a solid phase dextrose of one type in such relatively large amount that the quantity of the solid phase is a significant factor in controlling crystallization and at a temperature to produce a purgable mixture of mother liquor and dextrose crystals of said one type only, centrifuging the mixture to remove the mother liquor, melting the dextrose and subjecting the same to carbon filtration and recrystallization.

12. Method of making a crystalline starch converted dextrose which comprises subjecting the converted liquor in a concentrated state and without precedent carbon filtration to crystallization with the magma in motion, in the presence of solid phase dextrose of one type only in amount sufficient so that the quantity of the solid phase is a significant factor in controlling crystallization, and at a temperature which will give a purgable mixture of mother liquor and crystals of the same type as the introduced solid phase, and centrifuging the mixture; subjecting the mother liquor to a second crystallizing operation under conditions substantially the same as those of the first crystallizing operation, and centrifuging the magma; and melting the dextrose from the first and second crystallizing operations and subjecting the same to another crystallizing operation under conditions substantially the same as those of the first and second crystallizing operations, and centrifuging the magma.

13. Method of making a crystalline starch converted dextrose which comprises subjecting the converted liquor in a concentrated state and without precedent carbon filtration to crystallization with the magma in motion, in the presence of solid phase dextrose of one type only in amount sufficient so that the quantity of the solid phase is a significant factor in controlling crystallization, and at a temperature which will give a purgable mixture of mother liquor and crystals of the same type as the introduced solid phase, and centrifuging the mixture; subjecting the mother liquor to a second crystallizing operation under conditions substantially the same as those of the first crystallizing operation and centrifuging the magma; then melting the dextrose from the first and second crystallizing operations and subjecting the same to carbon filtration and to another crystallizing operation under conditions substantially the same as those of the first and second crystallizing operations and centrifuging the magma.

14. Method of making crystalline starch converted dextrose which comprises: concentrating the converted liquor to a density between 38° Baumé and 45° Baumé; cooling the concentrated liquor and then mixing the same with unset foots from a previous crystallizing operation of a single crystal type in amount sufficient so that the quantity of the solid phase is a significant factor in controlling crystallization and crystallizing the magma at temperatures which are gradually reduced as the crystallizing operation proceeds; centrifuging the magma while in a fluent state to remove mother liquor and washing the sugar; melting the sugar, running the same through bone char and concentrating the filtered liquor and subjecting the same to a second crystallizing operation under conditions substantially the same as those of the first crystallizing operation; and centrifuging the resultant magma while in a fluent state.

15. Improvement in the method of manufacturing a starch converted crystalline dextrose which consists in concentrating and crystallizing the converted liquor without carbon filtration, and after separation from the dextrose of the mother liquor, purifying the sugar in melted condition by contact with carbon and then re-crystallizing the same.

16. Method of making a starch converted sugar which comprises converting the starch, filtering the same to remove suspended solid impurities, concentrating the filtrate, subjecting the same to a second filtration operation to remove the solids precipitated by the concentration, and then crystallizing the same without precedent carbon filtration.

17. Method of making a crystalline starch converted sugar which comprises concentrating and crystallizing the converted liquor without precedent carbon filtration, separating the crystals from the mother liquor, melting the crystals, and subjecting the melt to carbon filtration, subjecting the purified liquor to a second crystallizing operation and separating the crystals from the mother liquor.

18. Method of making crystalline starch converted dextrose which comprises bringing about supersaturation of the converted liquor to crystallize the dextrose, separating the mother liquor from the crystals while the magma is in a fluent state, melting the dextrose, and subjecting the syrup to carbon filtration and bringing about crystallization of the dextrose.

19. Method of making crystalline starch converted dextrose which comprises bringing about supersaturation of the converted liquor, after mechanical filtration of the same, to crystallize the dextrose, separating the mother liquor from the crystals while the magma is in a fluent state, melting the dextrose and subjecting the syrup to carbon filtration and then to a second crystallizing operation.

20. Method of making crystalline starch converted dextrose which comprises bringing about supersaturation of the converted liquor in the presence of solid phase dextrose in an amount sufficient so that the quantity of the solid phase is a significant factor in controlling crystallization, separating the mother liquor from the crystals, melting the solid dextrose, subjecting the melt to carbon filtration, recrystallizing the dextrose and separating the solid dextrose from the mother liquor.

21. Method of making a high purity crystalline starch converted dextrose which consists in subjecting the liquor from the converter to mechanical filtration and evaporation, crystallizing the dextrose, separating the mother liquor from the solid dextrose, melting the solid dextrose and subjecting the melt to purification and crystallization, and separating the mother liquor from the dextrose crystals.

22. Method of making a high purity crystalline starch converted dextrose which consists in subjecting the liquor from the converter to mechanical filtration and evaporation, crystallizing the dextrose, separating the mother liquor from the solid dextrose, melting the solid dextrose and subjecting the melt to carbon filtration, and separating the mother liquor from the dextrose crystals.

23. Improvement in the manufacture of high purity dextrose which comprises crystallizing a converted liquor, removing some of the impurities from the crystallized magma by centrifuging, re-melting the remaining substance, recrystallizing the dextrose and centrifuging the magma to separate the mother liquor from the dextrose crystals.

WILLIAM B. NEWKIRK.